Patented June 5, 1945

2,377,584

UNITED STATES PATENT OFFICE 2,377,584

OXIDATION OF UNSATURATED ALDEHYDES

Hanns Peter Staudinger, Ewell, and Karl Heinrich Walter Tuerck, Banstead, England, assignor to The Distillers Company Limited, Edinburgh, Scotland, a British company No Drawing. Application August 18, 1941, Serial No. 407,352. In Great Britain September 26, 1940

14 Claims. (Cl. 260—530)

This invention is for improvements in or relating to the oxidation of unsaturated aldehydes with a view to the production of oxygenated aldehydes, i. e., polyhydroxy aldehydes, and in particular of dihydroxy aldehydes and/or their derivatives such as acetals, esters and ethers.

It is an object of this invention to produce these oxygenated aldehydes by the oxidation of $\alpha$-$\beta$-unsaturated aldehydes with molecular oxygen and to isolate them from the reaction mixture. Polyhydroxy aldehydes are easily resinified and it is therefore a further object of this invention to prevent resinification taking place during the production, recovery and isolation of the polyhydroxy aldehydes.

The oxidation of acrolein and crotonaldehyde to their respective acids (acrylic acid and crotonic acid) by means of gaseous oxygen has been previously disclosed in the literature, but it has not previously been known that during this oxidation reaction polyhydroxy compounds are formed. The conditions under which these oxidations have been carried out have been, in most cases, such as to resinify or destroy any dihydroxy aldehydes which might have been formed at the time and consequently the isolation of these polyhydroxy compounds has never been achieved. The fact that oxygenated aldehydes are formed when the oxidation of $\alpha$-$\beta$-unsaturated aldehydes is carried out by means of molecular oxygen, is therefore surprising as the oxidation of aldehydes with molecular oxygen has hitherto always led to the production of the corresponding acid or acid anhydrides. The oxygenated aldehydes possess properties analogous to those of the lower sugars, that is to say, they will reduce Fehling's solution even in the cold and they will form condensation products with phloroglucinol.

The present invention is therefore based upon the discovery that the oxygenated aldehydes are formed during the oxidation of $\alpha$-$\beta$-unsaturated aldehydes and the invention accordingly comprises a process for the production of oxygenated aldehydes which comprises oxidising an $\alpha$-$\beta$-unsaturated aldehyde by means of molecular oxygen in a substantially non-alkaline reaction mixture at a controlled temperature below the temperature of resinification of the polyhydroxy aldehyde (preferably below 40° C.), and thereafter separating the oxygenated aldehyde from the reaction mixture.

The oxidation is preferably carried out in the presence of a small amount, say up to 20%, of water. This water may be added intermittently during the oxidation and increases the yield of the dihydroxy compounds. Organic solvents may also be used. Catalysts have been found to exert a beneficial influence and the ratio of unsaturated acid to dihydroxy-aldehyde in the product has been found to vary with the nature of the catalyst used. We have found that osmic acid is the most satisfactory catalyst for the production of dihydroxy aldehydes from unsaturated aldehydes. Compounds of the heavy metals act as catalysts and other oxides which have given favourable results are vanadic oxide, chromic acid and molybdic oxide. We have found that the temperature during the oxidation should be maintained below 50° C. but as a whole the temperature depends on the individual aldehyde and its concentration; preferably the temperature is not allowed to rise above 40° C. The optimum temperature can be found from a preliminary experiment in which the temperature of oxidation is allowed to rise gradually, until the reaction medium shows a definite brownish-yellow coloration. The optimum temperature for the oxidation of acrolein is lower than that for crotonaldehyde.

It is also possible to conduct the oxidation in the presence of a saturated aldehyde, e. g., acetaldehyde. The acetaldehyde is oxidised to acetic acid and this has been found to lead to an improvement in the ratio of dihydroxyaldehyde to unsaturated acid in the reaction product.

The dihydroxy aldehyde may be recovered by distilling off the $\alpha$-$\beta$-unsaturated acid together with any unchanged $\alpha$-$\beta$-unsaturated aldehyde, care being taken that the temperature is maintained below that at which substantial resinification of the dihydroxyaldehyde takes place. This may be accomplished by distillation of the acid and unsaturated aldehyde with steam or "in vacuo." It is also important to avoid, at the recovery stage, the presence of substantial amounts of concentrated mineral acids, as these tends to promote decomposition of the dihydroxyaldehyde at raised temperatures. The unsaturated acid may also be extracted from the aqueous solution of the reactants by means of organic solvents.

If desired the reaction mixture may be subjected to a further chemical reaction in which the hydroxyl and/or aldehyde group enters into the reaction before separation is effected. The reaction mixture, may, for example, be treated with an alcohol and an esterification catalyst so that the acid is esterified and the dihydroxyaldehyde converted to its acetal; these products may then be separated by extraction or distillation. Another method which is possible, is to subject the reaction mixture to hydrogenation when the dihydroxyaldehyde is converted to its corresponding trihydric alcohol and the unsaturated acid is converted to the saturated acid. Yet a further method of treatment is to heat the reaction mixture with dilute sulphuric acid, for example, when the dihydroxyaldehyde is converted to the corresponding ketoaldehyde.

The following examples illustrate the manner in which the invention is to be carried into effect:

*Example 1.*—Air was blown through 108 grams of crotonaldehyde saturated with water and containing 0.02 gram osmic acid, for five hours while the temperature of the mixture was maintained at 30–35° C. Water was added gradually throughout the reaction until 20 grams had been introduced. The unchanged crotonaldehyde and water were distilled off "in vacuo" below 40° C. at 4 mm. pressure. The residue containing 20 grams of methyl glyceraldehyde and 16 grams crotonic acid was diluted with water and extracted with benzene. The methyl glyceraldehyde was isolated from the aqueous layer by distilling off the water under reduced pressure. When the oxidation was carried out in the absence of a catalyst 8 grams of methyl glyceraldehyde were obtained in addition to 24 grams of crotonic acid. In this case the crotonic acid was isolated by crystallising it from the cooled aqueous solution in which the methyl glyceraldehyde remained dissolved.

*Example 2.*—80 grams of freshly distilled crotonaldehyde were oxidised with air at 30–40° C. for 10 hours whilst 10 cc. of a 1% solution of freshly prepared vanadic acid were added throughout the reaction. After 20 grams of crotonaldehyde had been distilled under vacuum from the residue a clear syrup containing 22.4 grams of crotonic acid and 11.6 grams of methyl glyceraldehyde was obtained. Part of this aldehyde is only slightly soluble in water but dissolves after standing with dilute sulphuric acid.

*Example 3.*—41 grams of acrolein were oxidised at 20° C. in the presence of 15 grams of acetic acid, 7 grams water 0.01 gram of osmic acid. After 7 hours the mixture contained 12 grams of acrylic acid and 16 grams of glyceraldehyde. The unconverted acrolein as well as the acetic acid were distilled "in vacuo". The residue containing the acrylic acid and the glyceraldehyde was steam distilled. The condensate contained the acrylic acid, the residue, the pure glyceraldehyde.

The oxygenated aldehydes are extremely important intermediate compounds in connection with the production of various substances used in industry and the present invention provides a very simple and efficient process for the production of these substances. In particular glyceraldehyde is a substance of great importance and the process of the present invention enables this substance to be produced with high efficiency and in good yield.

What we claim is:

1. A process for the production of a saturated aldehyde having an hydroxy group attached to each of the $\alpha$ and $\beta$ carbon atoms, which comprises oxidizing an aliphatic $\alpha:\beta$-unsaturated aldehyde in the liquid phase to a mixture of the corresponding $\alpha:\beta$-unsaturated acid and the corresponding aliphatic saturated $\alpha:\beta$-dihydroxy aldehyde, by means of molecular oxygen in a substantially non-alkaline aqueous reaction mixture at a temperature not exceeding 50° C., and thereafter separating the said saturated aldehyde from the co-present unsaturated acid in the reaction mixture at a temperature below 50° C. by means of distillation.

2. A process according to claim 1 wherein water in an amount up to 20% by weight, is added to the reaction mixture.

3. A process according to claim 1 wherein water in an amount up to 20% by weight is added intermittently to the reaction mixture during the oxidation.

4. A process according to claim 1 wherein the reaction is carried out in the presence of an organic solvent.

5. A process according to claim 1 wherein compounds of the heavy metals are used as catalysts.

6. A process according to claim 1 wherein the reaction is carried out in the presence of osmic acid as a catalyst.

7. A process according to claim 1 wherein the reaction is carried out in the presence of a saturated aldehyde whereby the formation of unsaturated acid is reduced.

8. A method according to claim 1 wherein the reaction mixture, after the completion of the reaction, is directly subjected to a hydrogenation reaction whereby the said saturated aldehyde is converted to the corresponding alcohol.

9. A process for the manufacture of $\beta$-methyl glyceraldehyde which comprises oxidising crotonaldehyde, saturated with water, by means of air at between 30° and 40° C. in the presence of a small amount of 1% vanadic acid solution to a mixture of crotonic acid and $\beta$-methyl glyceraldehyde and thereafter separating the $\beta$-methyl glyceraldehyde from the co-present crotonic acid at a temperature below 50° C. by means of distillation.

10. A process for the preparation of $\beta$-methyl glyceraldehyde which comprises saturating crotonaldehyde with water, adding a small amount of osmic acid thereto, blowing air through the mixture to produce a reaction mixture containing crotonic acid and $\beta$-methyl glyceraldehyde whilst maintaining a reaction temperature between 30 and 35° C., adding not more than 20% by weight of water to the reaction mixture during the oxidation and separating the $\beta$-methyl glyceraldehyde from the co-present protonic acid at a temperature below 50° C. by means of distillation.

11. A process for the manufacture of glyceraldehyde which comprises oxidising acrolein to a mixture of acrylic acid and glyceraldehyde by means of molecular oxygen at a temperature of 20° C. in the presence of acetic acid as solvent, not more than 20% by weight of water and a small amount of osmic acid as catalyst and thereafter separating the glyceraldehyde from the co-present acrylic acid at a temperature below 50° C. by means of distillation.

12. In the manufacture of an aliphatic unsaturated monocarboxylic acid by causing molecular oxygen to oxidise, in the liquid phase, the corresponding $\alpha$-$\beta$-unsaturated aldehyde in the presence of not more than 20% by weight of water at temperatures below 50° C. to a mixture of the unsaturated acid and the corresponding saturated aldehyde having oxygen atoms attached to the $\alpha$ and $\beta$ carbon atoms, the step of isolating the formed aliphatic $\alpha$-$\beta$-hydroxylated saturated aldehyde from the co-present unsaturated acid in reaction mixture at a temperature below that at which said saturated aldehyde resinifies at a temperature below 50° C. by means of distillation.

13. In the manufacture of crotonic acid by causing gaseous oxygen to oxidise liquid crotonaldehyde in the presence of water in an amount not exceeding 20% by weight at a temperature below 40° C. with the formation of β-methylglyceraldehyde the step of isolating said β-methylglyceraldehyde from the reaction mixture at a temperature below 50° C. by means of distillation.

14. In the manufacture of crotonic acid by causing air to oxidise liquid crotonaldehyde in the presence of water in an amount not exceeding 20% by weight at a temperature between 30° and 40° C. and in the presence of a catalyst consisting of a compound of a heavy metal with the formation of β-methylglyceraldehyde the step of isolating said β-methylglyceraldehyde from the reaction mixture at a temperature below 50° C. by means of distillation.

HANNS PETER STAUDINGER.
KARL HEINRICH WALTER TUERCK.